Oct. 4, 1938. W. C. ROBINETTE 2,132,048
COLOR ANALYZER AND REPRODUCER
Filed Feb. 3, 1936 2 Sheets-Sheet 2
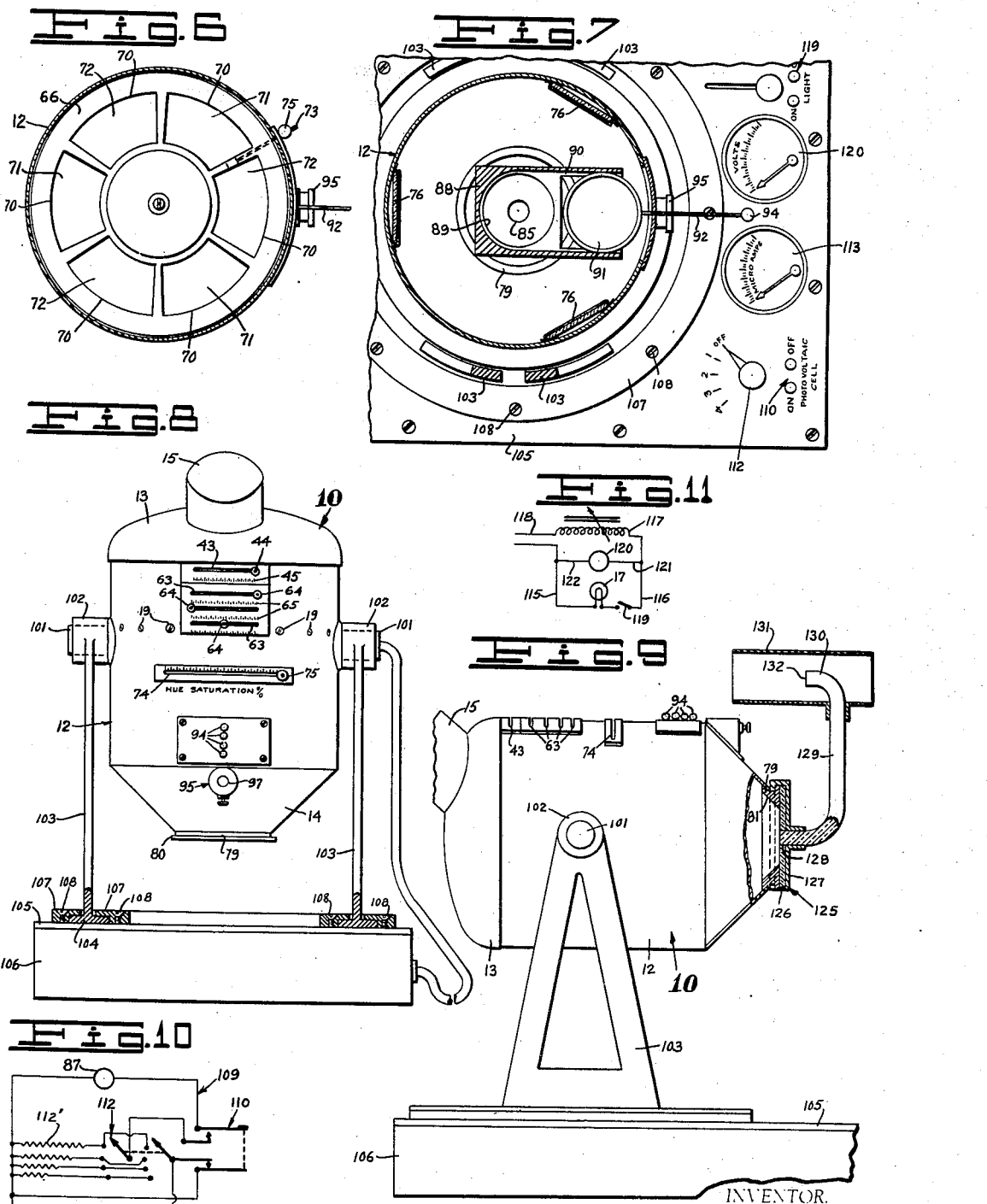
INVENTOR.
WILLARD C. ROBINETTE.
BY
ATTORNEY.

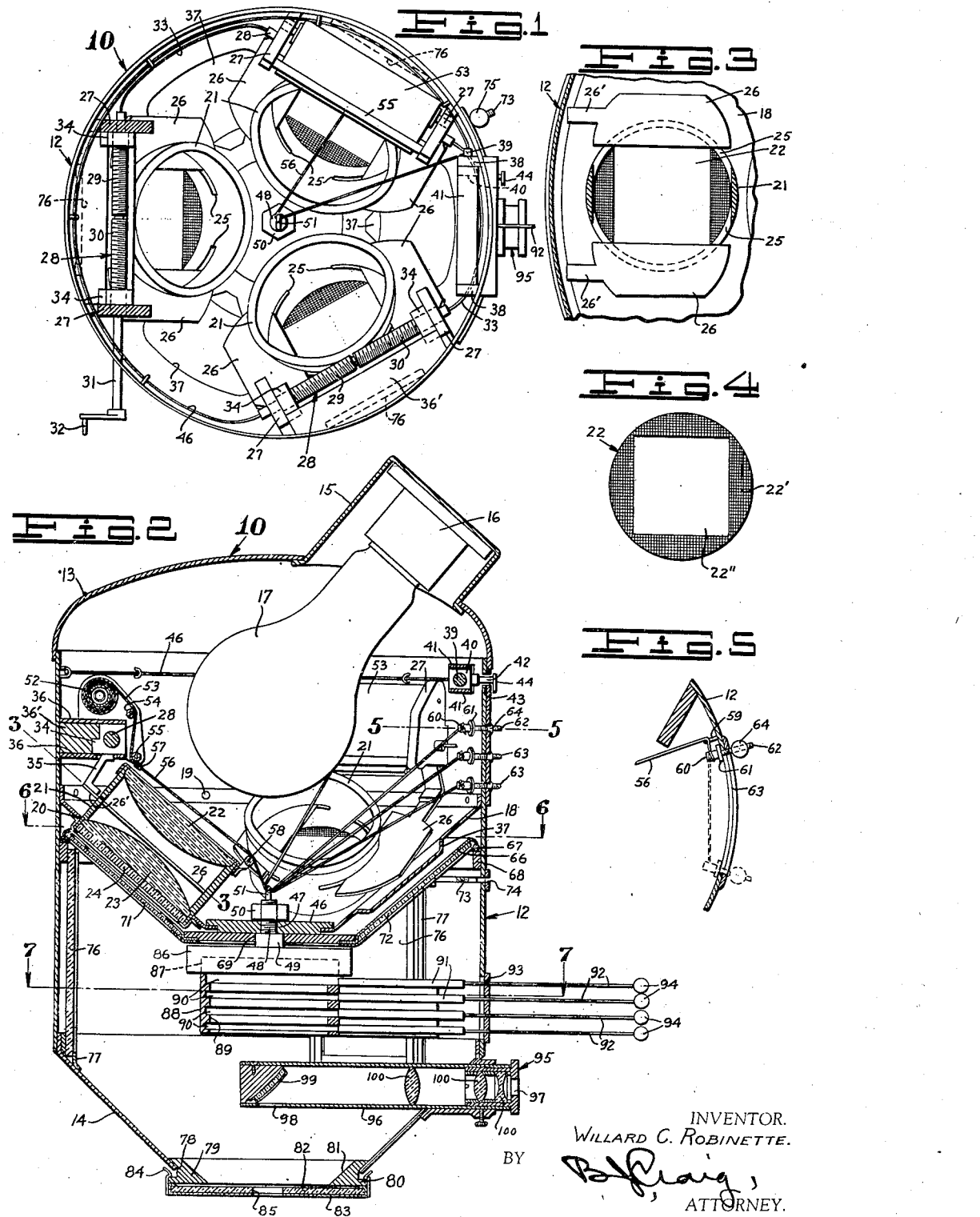

Patented Oct. 4, 1938

2,132,048

UNITED STATES PATENT OFFICE 2,132,048

COLOR ANALYZER AND REPRODUCER

Willard C. Robinette, Pasadena, Calif.

Application February 3, 1936, Serial No. 62,059

12 Claims. (Cl. 88—14)

This invention relates to an improvement in apparatus for analyzing and reproducing light.

An object of this invention is to provide an improved apparatus for analyzing light.

Another object of the invention is to provide an apparatus with which to analyze the color composition of light in terms of the sensitivities of the different light recording elements of a system of color photography.

Another object is to provide an apparatus which will photo-electrically analyze a color.

A further object is to provide an apparatus which will reproduce at any time a light which will have in selected regions the same actinic value as the original light.

An additional object is to provide a novel apparatus for producing lights of different hue.

Other objects and the advantages of my invention will be apparent from the following description taken in connection with the accompanying drawings, wherein:

Fig. 1 is a top plan view of my improved color analyzer with the cover member thereof removed;

Fig. 2 is a cross section through my device;

Fig. 3 is a fragmentary section taken on line 3—3 of Fig. 2;

Fig. 4 is a top plan view of one of the lens members of the device;

Fig. 5 is a fragmentary section taken on line 5—5 of Fig. 2;

Fig. 6 is a section on a reduced scale taken on line 6—6 of Fig. 2 with the conical partition removed;

Fig. 7 is a section on a reduced scale taken on line 7—7 of Fig. 2;

Fig. 8 is a front view of the device on a reduced scale and with portions thereof in section;

Fig. 9 is a fragmentary side view of the device showing an attachment thereon;

Fig. 10 is a wiring diagram of the photo-electric cell circuit; and

Fig. 11 is a wiring diagram of the light circuit.

Referring to the drawings by reference characters I have indicated my improved color analyzer device generally at 10. As shown the device 10 includes a circular casing 12 having a dome shaped top member 13 and a frusto-conical lower member 14. The top member 13 includes a hollow protuberance 15 in which an electric light socket 16 is positioned which operatively supports an electric light bulb 17.

Positioned in the casing 12 below the light bulb I provide a downwardly extending frusto-conical partition 18 which is shown as secured to the casing by screws 19. The partition 18 has three equally spaced apertures 20 therein in each of which a lens holder 21 is positioned and secured to the partition as by welding it thereto.

Each of the holders 21 adjacent the top thereof has a lens member 22 suitably mounted therein and adjacent the lower end has a lens member 23 and a daylight correction filter member 24 suitably mounted therein. As shown in Fig. 4 each of the lens members 22 has a coating 22' thereon of opaque material which is placed to define a central square portion 22" which is clear. The lens members 23 like the lens members 22 each have a coating of opaque material thereon to define a central square portion which is clear. Between the lens members 22 and 23 the lens holders 21 have slots 25 therein on opposite sides and in each of these slots a flat shutter member 26 is positioned. Each of the shutter members includes an arm portion 26' extending from the side thereof towards the side of the casing. (See Fig. 3.)

Mounted on the casing 12 above each of the lens holders 21 I provide a pair of spaced brackets 27. Each pair of brackets supports a stem member 28 half of which is provided with right hand screw threads as indicated at 29, and the other half of which is provided with left hand threads as indicated at 30. One of the stems 28 includes a reduced stem portion 31 which extends out of the casing 12 and has a crank handle 32 thereon. The opposite end of the stem 28 having the handle thereon is connected to the next adjacent stem 28 by a torque transmitting member such as a piano wire 33 and that stem is connected to the next stem 28 by a similar wire 33.

Mounted on each of the stem portions 29 and 30 I provide a pair of threaded block members 34 each of which includes a downwardly extending arm 35 (Fig. 2) which is suitably secured to the arm 26' of its associated shutter member 26. Extending from one bracket 27 to the other of each set I provide plates 36 above and below the blocks 34 to prevent rotation of the blocks when the stem 28 is rotated.

From the foregoing it will be apparent that when the crank 32 is turned to rotate its associated stem 28 the other two stems 28 will be rotated through the medium of the piano wires 33. When the stems 28 are rotated in one direction each set of blocks 34 will travel towards each other and when the stems are rotated in the opposite direction each set of blocks 34 will travel away from each other. The blocks 34 travel towards each other until the inner edges of the associated shutter members 26 meet and when the blocks travel away from each other they travel apart only until the clear portion 22″ of the associated lens 22 is fully exposed.

Intermediate the lens holders 21 the partition 18 includes depressed portions 37 to provide clearance for the shutter members 26 when they are in a fully opened position.

Opposite the stem 28 having the crank 32 thereon I provide a pair of spaced brackets 38 which are mounted on the casing 12 and support a threaded stem 39. Mounted on the stem 39 I provide a block 40 which threadedly engages the stem. Extending from one bracket 38 to the other above and below the block 40 I provide plates 41 to prevent the block from rotating. The block 40 has a stem 42 extending from one side thereof which is positioned in a slot 43 in the casing 12 and on the exterior of the casing the stem 42 has an indicator member 44 thereon which coacts with a scale 45. (See Figs. 2 and 8.) One end of the threaded stem 39 is connected by a torque transmitting piano wire 46 to the free end of the last of series of stems 28. (See Fig. 1.) Thus when the stems 28 are rotated the stem 39 will be rotated and the block 40 thereon will travel therealong and the indicator 44 in association with the scale 45 will indicate the positions of the shutters 26.

The bottom of the frusto-conical partition 18 has an aperture therein in which a thick plate member 46 is positioned and secured to the partition as by welding. The plate 46 has a central aperture 47 therein in which the reduced threaded shank 48 of a bolt 49 is positioned. Above the plate 46 the shank 48 has a nut 50 thereon to clamp the bolt 49 to the plate. The end of the shank 48 above the nut 50 includes an eyelet member 51.

Mounted on each pair of the brackets 27 above the upper plates 36 I provide spring retractable rollers 52 on which flexible curtains 53 of opaque material are secured and wound. Each of the curtains 53 extends over a roller member 54 and under a roller member 55 to adjacent the upper face of the upper lens member 22. The rollers 54 and 55 are rotatably supported by the brackets 27. Each of the curtains 53 has a cord 56 secured thereto as at 57 which extends downward and centerward over a roller 58 and passes through the eyelet 51 and then extends outward and upward through an eyelet 59 to a stud 60 to which it is suitably secured. As clearly shown in Fig. 5 each of the studs 60 includes an enlarged flange portion 61 and a reduced threaded stem portion 62 which is positioned in a slot 63 in the casing 12. On the exterior of the casing the threaded stems 62 have nut members 64 thereon.

From the foregoing it will be seen that when one of the studs 60 is moved from its initial position at one side of the slot 63 towards the opposite side the associated cord 56 will move and in turn will unroll its associated curtain which will be moved across the lens 22. The stud 60 may be stopped and retained in any position by clamping the nut member 64 to the casing. A scale 65 is provided adjacent each of the studs 60 to indicate the positions of the curtains 53. When the nut 64 is released the spring retractable roller 52 will reroll the curtain 53.

Below the frusto-conical partition 18 I provide a movable frusto-conical member 66. (Figs. 2 and 6.) The upper edge of the member 66 is shown as curved downward and secured to a circular rod 67 which is supported on a circular rail 68 secured to the casing 12. The bottom of the member 66 has an aperture 69 therein in which the bolt 49 is positioned. The side walls of the member 66 have six equally spaced apertures 70 therein (Fig. 6), the alternate ones of which are closed by neutral density filter members 71 and the other three are closed by color filters 72 such as red, blue, and green. The color filters 72 are preferably compound filters, each consisting of a color filter of desirable transmission characteristics, and a companion neutral density filter to suitably adjust the total transmission of the combination.

Suitably secured to the member 66 I provide a radially disposed stem 73 the outer end of which is threaded. The stem 73 is positioned in a slot 74 in the casing 12 and on the exterior of the casing the stem has a nut member 75 thereon. By moving the stem 73 the member 66 can be rotated to positions where the neutral density filters 71 are entirely positioned in line with the lenses or the color filters entirely positioned in line with the lenses or to positions where parts of the neutral density filters and parts of the color filters are in line with the lenses. The member 66 may be retained in any desired position by clamping the nut 75 against the casing.

Adjacent the sides of the casing below each of the lens devices I provide a plane vertical mirror 76 which is retained in position by frames 77 suitably secured to the casing.

The bottom member 14 of the casing 12 has an aperture 78 therein in which a collar member 79 is positioned and secured to the member 14 as by welding. Below the member 14 the collar member 79 has an enlarged flange 80 thereon and concentric with the axis of the casing the member 79 has an aperture 81 therein, the side walls of which are downwardly convergent as shown in Fig. 2.

Supported on the member 79 I provide a white diffuse reflector member 82 which is mounted in a casing 83 having spring clips 84 thereon which removably engage the upper face of the flange 80 of the device 79. Both the reflector member 82 and the casing 83 have a central aperture 85 therein.

When the bulb 17 is lighted the light rays therefrom pass through the lenses 22 and 23 and the filters 24 and 71 or 72 onto the mirrors 76 from which they are reflected onto the reflector member 82.

Mounted on the bolt 49 below the member 66 I provide a casing 86 having a standard photovoltaic cell 87 therein and mounted on the casing 86 I provide a frame 88. The frame 88 has a central aperture 89 therein and a plurality of grooved track portions 90 in each of which color filter members 91 are positioned. Each of the filter members 91 includes a stem portion 92 which is positioned in an aperture 93 provided in the casing 12. On the exterior of the casing 12 each of the stems 92 preferably has a knob handle portion 94 thereon.

Intermediate the frame 88 and the member 79 I provide a viewing member 95. As shown the viewing member 95 includes a housing 96 having a viewing aperture 97 therein at one end and an image aperture 98 in the bottom thereof adjacent the opposite end. Within the housing 96 adjacent the aperture 98 a curved angularly positioned reflector 99 is provided and between the reflector 99 and the viewing aperture 97 a plurality of lens members 100 are provided.

As shown in Figs. 8 and 9 the casing 12 has a pair of opposed trunnion members 101 thereon each of which is mounted in a bearing 102 of a supporting leg 103 which is integral with a flat ring member 104. The ring member 104 is mounted on a plate 105 which forms the cover of a box like housing 106. The ring 104 is shown as retained in position by circular track members 107 which are removably secured to the plate 105 by screws 108.

As shown in Fig. 10 the photo-voltaic cell 87 is operatively connected to a suitable metering circuit 109 which includes a control switch 110, a resistance switch 112 and a microammeter 113. Across the meter 113 I preferably provide a variable compensator resistance 114 which provides means to suitably adjust the reading of the meter 113 to any standard desired. Connected to each pair of the contacts of the switch 112 I provide a resistance 112'. Each of the resistances 112' is so chosen to give the proper meter reading for a corresponding filter 91.

As shown in Fig. 11 one side of the bulb 17 is conected by a wire 115 to one side of a source of electrical energy. The opposite side of the bulb 17 is connected by a wire 116 to one side of a variable transformer 117 and the opposite side of the transformer is connected by a wire 118 to the other side of the source of electrical energy. A control switch 119 is interposed in the wire 116 and a volt meter 120 is bridged across the wires 115 and 116 by wires 121 and 122. By providing the variable transformer 117 the voltage to the bulb 17 may be maintained at the same degree at all times.

In Fig. 9 I have shown the device 10 having a visual color analyzer attachment 125 thereon in place of the reflector member 82. As shown the device 125 includes a reflector member 126 which is similar to the reflector member 82 and is mounted in a holder 127 which is suitably mounted on the flange 80 of the end member 79. Both the reflector 126 and the holder 127 have an aperture 128 therein in which a clear quartz rod 129 is positioned. The exterior of the quartz rod 129 is coated with a suitable black material. The rod 129 curves upward and then back in the same direction as the first curve as indicated at 130. Mounted on the rod 129 I provide a hollow cylinder 131 which is open at both ends and is preferably coated with a suitable black material on the inside. The end of the rod 129 positioned within the cylinder 131 is preferably provided with a diffuse transmitting surface 132.

In operation a sample of the color to be analyzed is positioned below and in juxtaposition with the aperture 81 in the lower end of the device 10 after the diffuse reflecting member 82 and casing 83 have been removed and the bulb 17 illuminated. The viewing member 95 is withdrawn radially until it no longer obstructs the passage of light from the aperture 81 to the device 87. As previously described the rays from the bulb pass through the lenses 22 and 23, the daylight correction filters 24, the neutral density filters 71, and onto the aperture 81 and illuminate the sample with a standard light flux intensity of a standard composition, namely, white light.

The reflected light from the sample causes the photo-voltaic cell 87 to emit a small current, which can be measured by the metering apparatus 113 and the associated circuit. (See Fig. 10.) The standard illumination present on the sample, and the metering system (shunt across the microammeter) are chosen so that if a series of white objects with varying reflection factors are placed in the aperture 81, the metering apparatus will always give a direct reading of the reflection factor. In other words, if the illumination on the sample is 100 foot-candles, and the photoelectric measuring equipment is calibrated to read in units of $\pi$ times the brightness (B) in candles per square foot then the reflection factor of the sample is numerically equal to the $\pi$ B reading.

The photo-voltaic cell 87 should have a spectral response approximating that of the human eye, and a linear response curve within the range of intensities considered.

The reflected light from the sample is passed consecutively through a series of the color analyzing filters 91 one at a time before it is allowed to reach the photo-voltaic cell. The cell 87 is stimulated to a varying extent depending on the quantity of radiation reaching it through the analyzing color filter 91 which is in use.

Thus each analyzing color filter 91 and its appropriate resistance 112' is chosen so that for white objects, illuminated in white light, the indications on the metering apparatus are equal. At present I prefer to use three analyzing color filters, red, green, and blue, but it will be understood that I may add other color filters and other neutral density filters to extend the range of colors and intensities available without departing from the spirit of my invention.

Thus a reading of a greater transmission of light from the sample through any one of the filters 91 would indicate that there was more of that color light reflected from the sample. In other words the sample has absorbed some of the white light incident upon it, and reflected another portion to a greater extent. Thus if the test sample is a blue object, the output of the cell 87 would register more through the blue filter than it would through either the green or the red. Theoretically, if the blue object reflected a completely saturated blue (not mixed with white light), and a set of filters with sharp and not overlapping transmission cut off characteristics were employed, then the metering apparatus 113 and associated circuit would only give a reading for transmission through the blue filter, and not through the other two. However, this result is unlikely as almost all colors are not completely saturated, but are mixed with varying proportions of white light.

The transmission readings thus found furnish identification to reproduce the color at any later date. The color so reproduced will have the identical actinic effect on any color camera using the selected filter values as the original sample.

In the previous paragraphs I have described the method of color analysis which furnishes the reflection factor of the sample, which is a measure of color brilliance, and the proportions of light reflected from the object through various color analyzing filters 91 which in turn furnish a close indication of the hue saturation. This method is only applicable when the sample can be brought into contact with the device 10.

In the event that the object color cannot be directly analyzed, or it is desirable to determine the color components of the object when it is illuminated by other than white lights, such as in the case of objects lighted with incandescent light, or when the colored subject is imponderable, such as e. g. the purple shades surrounding the mountains at sundown—then color analysis by substitution is resorted to.

In this case the technic is as follows: The white test plate 82 with the concentric aperture 85 therein is clamped to the field position of the device 10 in juxtaposition with the aperture 81 as shown in Fig. 2. The eyepiece viewing device 95 is also positioned with the convex mirror 99 on the axis of the aperture 85. The subject or color to be analyzed is then brought into view by pointing the device 10 in its direction. The color should completely fill the center field, visible through the eyepiece and the aperture 85. If it does not, then the need of a decrease in distance of the device 10 from the subject is indicated.

The controls of the device 10 are then manipulated to illuminate the test plate 82 with light of the same composition as that visible through the aperture 85 in the test plate. This is done by watching the test plate through the viewing device 95 and comparing the outside field on the plate 82 with the color visible through the aperture 85 in the test plate. After a color balance is obtained the brilliance control 44 is moved to obtain a field of uniform brilliance matching that of the color visible through the aperture 85. When this is accomplished, the division between the center aperture 85 and the color field on the plate 82 will become hazy and indistinguishable.

When this balance is obtained, the eyepiece 95 is pulled out from in front of the photo-voltaic cell 87. Then with none of the filters 91 in front of the photo-sensitive surface, the metering apparatus is read. This figure is indicative of the color brilliance, or reflection factor of the subject if correction is made to consider the light by which the subject is illuminated. In succession the light transmission through the color filters 91 is read from the metering apparatus 113. These four determinations, brightness, and three color transmission readings will, in general, be different from the results that would have been obtained had the subject been analyzed by the method previously described unless the subject is illuminated by light of the same white composition and of the same intensity as that furnished by the device 10. This is as it should be, because the apparent color of objects is changed if the color of light falling on them is changed.

When it is desired to use my other method of analyzing a color at a distance the reflector 82 is removed from the device 10 and the device 125 positioned thereon.

The subject to be analyzed is aligned with the cylinder 131 so that the surface 132 is partially obscuring the subject. Then the controls of the device 10 are manipulated until the light transmitted through the rod 129 matches in color and intensity the appearance of the subject. Then the scales of the controls of the device 10 can be read directly to obtain the color analysis, without completing the analysis with the photo-voltaic cell.

The substitution method in both cases furnishes readings of the color components present in the subject, together with the reading on the brilliance control of the device 10 necessary to reproduce the subject color when the subject color is illuminated by light of the color and intensity present at the time of analysis. This reading of the brilliance control 44 (which corresponds to the reading of the reflection factor (color brilliance) obtained in the first method, when the colored subject is illuminated by the standard intensity) bears no direct relationship to the reflection factor of the subject. However, the reflection factor of the subject color can be deduced rather closely by considering the character of illumination (color and intensity) falling upon it.

The analyzation of this incident radiation will now be discussed.

Primary colored radiation, from a single light source, may be analyzed simply by pointing the device 10 at the source with no test plate on the field aperture 81 and reading the transmission through the various filters. The illumination value in foot candles may be read with the proper neutral density filter 91 in front of the photo-sensitive surface, and the switch 112 set to the proper contact 112'. In the event that the light from several sources is required, the light from each may be analyzed in turn.

The device 10 will reproduce any color that it is possible to reproduce by any three-color additive or subtractive process using color filters by combining the three primary colors or their complementary colors in any desirable combination desired by the operator. The present drawings call for only the three reproduction color filters mounted on the rotating color member 66 although others such as complementary color filters may be employed.

The scales of the individual controls 64 are arranged so that with the brilliance control 44 set to give the standard illumination used for color analysis and the hue saturation control 75 at 100% and only one color control 64 open, the reading of the brightness of the solid test plate through the corresponding color analyzing filter will be equal to the scale reading of that color control 64.

Thus to get a transmission reading through the red analyzing filter 91 of 20 units, the solid white test plate is clamped to the field opening of the device 10, the brilliance control 44 set to standard illumination, hue saturation 75 to 100%, and the red color control is set to a scale reading of 20.

Thus to duplicate any color that has previously been analyzed it is only necessary to set the corresponding values of the transmission readings upon the scales of the individual color controls. (The relationship between the scales and the transmission readings can be checked by repeating the analysis of the first described method on any color standard, or with the solid white test plate in place in the device.) This setting of the color controls reproduces the color balance present in the original sample, but because the reflection factor of the test plate is, in general, quite different from the reflection factor of the original colored object, the brilliance control 44 will have to be changed to give the corresponding brightness (measured in the original with no filter in front of the photo-sensitive surface).

The test plate may then be examined through the eyepiece, or a special translucent test plate or ground glass placed in the field opening in place of the solid test plate, and then the reproduced color will be visible due to the transmitted light. If for any reason the translucent plate does not transmit the same amount of light as the solid plate reflects, the brightness of the reproduced color will be different than that of the original color sample. However, for a given translucent material, the brightness control may be set to correct for the difference between the two test plates.

For certain cases the hue saturation control may be used in which case colored light of any composition may be mixed with any proportion of white light.

From the foregoing description it will be apparent that I have provided a novel color analyzer which is simple in construction and highly efficient in use.

Having thus described my invention I claim:

1. In a device for analyzing color, a support, a plurality of lens members on said support and positioned with their axes intersecting a source of light, a daylight correction filter member associated with each of said lens members, a reflector member associated with each of said lens members, light rays from said source being directed onto said reflectors by said lens members, an apertured member positioned to receive light rays from said reflectors, means to control the amount of light passing through said lens members, a plurality of color filter members mounted to move to position between said lens members and said reflector members, said apertured member constituting a support for a sample placed behind the aperture in the apertured member whereby the sample receives light from said reflectors, a photo-cell positioned to receive light from said sample and a plurality of color filter members, the last mentioned color filter members being movably mounted for positioning the same, at will, in or out of the light path between the sample support and the photo-cell.

2. In a device for analyzing color, a housing, a source of light in said housing, a plurality of lens members mounted in said housing, said lens members being positioned with the axes thereof intersecting said source of light, a filter member associated with each of said lens members, a reflector member associated with each of said lens members, said housing having an aperture, light rays from said source being directed onto said reflectors by said lens members, said reflector members being positioned to direct rays from said lens members through said aperture, means to independently reduce the amount of light passing through each of said lens members, means associated with said lens members to simultaneously reduce the amount of light passing through all of said lens members, means adapted to support neutral density filter members between said lens members and said reflector members, a photo-voltaic cell in said housing in alignment with the axis of said aperture and means to support a plurality of color filter members between said aperture and said photo-voltaic cell.

3. In a device for analyzing color, a housing, a source of light in said housing, a plurality of lens members mounted in said housing, said lens members being positioned with the axes thereof intersecting said source of light, a filter member associated with each of said lens members, said housing having an aperture, a plurality of mirrows being positioned to direct rays from said lens members through said aperture, means to independently reduce the amount of light passing through each of said lens members, means associated with said lens members to simultaneously reduce the amount of light passing through all of said lens members, means adapted to support neutral density filter members between said lens members and said mirrors, a reflector member closing said aperture, said closure reflector having an aperture therein, a removable viewing member in said housing, said viewing member including a plurality of lenses and a reflector member adapted to be positioned in alignment with the axis of said aperture of said closure reflector.

4. In a device for analyzing color, a housing, a source of light in said housing, a plurality of lens members disposed in said housing in the path of light from said source with their axes intersecting the source of light, a filter member associated with each of said lens members, a reflector member associated with each of said lens members, said housing having an aperture, light rays from said source being directed onto said reflector members by said lens members, said reflector members being positioned to direct rays from said lens members through said aperture, means to control the amount of light passing through each of said lens members, means adapted to support neutral density filter members between said lens members and said reflector members, a photo cell in said housing in alignment with the axis of said aperture and means to support a plurality of color filter members between said aperture and said cell.

5. In a device for analyzing color, a housing, a source of light in said housing, a partition in said housing and having spaced apertures therein, a lens holder fitted in each aperture, a lens member in each holder, means to independently reduce the amount of light which passes to each lens member from said source; a filter member mounted to move beneath said lens holders and in the path of light passing therethrough, a plurality of mirrors each disposed to reflect light from a single lens member, said housing having a reflecting member thereon to receive light from said mirrors, said reflecting member having an aperture, a quartz rod in said aperture, an opaque coating on said rod, a second housing mounted on said rod, the end of the rod being positioned within the second housing and a photo cell in said first housing in alignment with said rod.

6. In a device for anlyzing color, a housing, a source of light in said housing, a plurality of lens members mounted in said housing, said lens members being positioned with the axes thereof intersecting said source of light, a filter member associated with each of said lens members, said housing having an aperture, a plurality of mirrors each disposed to reflect light from a single lens member through said aperture, means to independently reduce the amount of light passing through each of said lens members, means associated with said lens members to simultaneously reduce the amount of light passing through all of said lens members, means adapted to support neutral density filter members between said lens members and said mirrors and a photo cell in said housing in alignment with the axis of said aperture.

7. In a device for analyzing color, a housing, a source of light in said housing, a plurality of lens members disposed in said housing to receive light from said source, a filter member associated with each of said lens members, said housing having an aperture, a plurality of mirrors each disposed to reflect light from a single lens member through said aperture, means to control the amount of light passing through each of said lens members, means adapted to support neutral density filter members between said lens members and said mirrors, a reflector member closing said aperture, said closure reflector having an aperture therein, a removable viewing member in said housing, said viewing member including a lens member and a reflector member adapted to be positioned in alignment with the axis of said aperture of said closure reflector.

8. In a device for analyzing color, a housing, a source of light in said housing, a plurality of lens members mounted in said housing, said lens members being positioned with the axes thereof intersecting said source of light, a filter member associated with each of said lens members, said housing having an aperture, a plurality of mirrors each disposed to reflect light from a single lens member through said aperture, means to independently reduce the amount of light passing through each of said lens members, means associated with said lens members to simultaneously reduce the amount of light passing through all of said lens members, means adapted to support neutral density filter members between said lens members and said mirrors, an apertured member positioned to receive light rays from said mirrors, means to support color filter members between said lens members and said mirrors, said apertured member constituting a support for a sample placed behind the aperture therein whereby the sample receives light from said mirrors and a photo-cell positioned to receive light from said sample.

9. In a device for analyzing color, a housing, a source of light in said housing, a partition in said housing and having spaced apertures therein, a lens member in each of said apertures, a filter holder having neutral density filters and color filters arranged in alternate order thereon, said holder being shiftable so as to bring either the neutral density filters or the color filters in the path of light rays passing through said lens members, a plurality of mirrors each disposed to reflect light from a single lens member, an apertured member constituting a support for a sample placed behind the aperture therein and adapted to receive light from said mirrors, a photo cell positioned to receive light reflected from said sample, said housing having an aperture therein and a viewing member slidably mounted in said housing aperture, said viewing member including a mirror, said viewing member being movable to a position wherein its mirror is in the path of light from said sample.

10. In a device for analyzing color, a housing, a source of light in said housing, a partition in said housing and having spaced apertures therein, a lens holder fitted in each of said apertures, a lens member in each holder, a shutter member adjacent to each lens member, means whereby the shutter members may be simultaneously moved, a movable curtain between said source of light and each lens holder, a filter holder having neutral density filters and color filters arranged in alternate order thereon, said holder being shiftable to a position to bring either the neutral density filters or the color filters in the path of light rays passing through said lens members, means to shift the filter holder, a plurality of mirrors each disposed to reflect light from a single lens member, an apertured member constituting a support for a sample placed behind the aperture therein and adapted to receive light from said mirrors, a photo cell positioned to receive light reflected from said sample, a color filter member movable from a position between said sample support and the photo cell to a position remote therefrom, said housing having an aperture therein and a viewing member slidably mounted in said housing aperture, said viewing member including a mirror, said viewing member being movable to a position wherein its mirror is in the path of light from said sample, said viewing member including a lens and an eye piece.

11. In a device for analyzing color, a cylindrical housing, a source of light in said housing, a partition in said housing and having spaced apertures therein, a lens holder fitted in each aperture, lens members in each holder, said lens members having an opaque coating thereon defining a central transparent aperture, each of said holders having a slot therein between said lens members, a shutter member disposed in each of said slots, means whereby the shutter members may be simultaneously moved, a curtain between said source of light and each lens holder, means to individually shift each curtain, a filter holder mounted to move beneath said lens members, neutral density filters and color filters arranged in alternate order on said filter holder, said holder being shiftable to a position to bring either the neutral density filters or the color filters in the path of light rays passing through said lens members, means to shift the filter holder, a plurality of mirrors each disposed to reflect light from a single lens member, an apertured member constituting a support for a sample placed behind the aperture therein and adapted to receive light from said mirrors, a photo cell positioned to receive light reflected from said sample, a plurality of color filter members slidably mounted and movable from a position between the photo cell and a sample on said support to a position remote therefrom, said housing having trunnions thereon and means to support said trunnions, said housing having a reflecting member thereon positioned to receive light from said mirrors, said reflecting member having an aperture, a quartz rod in said aperture, an opaque coating on said rod, a cylinder mounted on said rod, the end of the rod being positioned within the cylinder and having a diffuse transmitting surface thereon.

12. In a device for analyzing color, a cylindrical housing, a source of light in said housing, a partition in said housing, said partition having spaced apertures therein, a lens holder fitted in each of said apertures, a pair of spaced lens members in each holder, each of said holders having a slot therein between said lens members, a shutter member disposed in each of said slots, means operatively connected to said shutter members whereby the shutter members may be simultaneously moved, scale means associated with each of said shutters and adapted to indicate the position of the associated shutter, curtains between said source of light and each lens holder, means to individually shift each curtain, means to indicate the position of each curtain, a filter holder mounted to move beneath said lens holders, neutral density filters and color filters arranged in alternate order on said filter holder, said holder being shiftable to a position to bring either the neutral density filters or the color filters in the path of light rays passing through said lens members, means to shift the filter holder, means to indicate the position of the filter holder, a plurality of mirrors each disposed to reflect light from a single lens member, an apertured member positioned to receive light from said mirrors, said apertured member constituting a support for a sample placed behind the aperture therein whereby the sample receives light from said mirrors, a photo cell positioned to receive light reflected from said sample, a plurality of grooved tracks disposed between said photo cell and said apertured member, a color filter member slidably mounted on each track and movable from a position between the photo cell and a sample in said support to a position remote therefrom, said housing having an aperture therein and a viewing member slidably mounted in said aperture, said viewing member including a mirror, said viewing member being movable to a position wherein the mirror is in the path of light from said sample, said viewing member including a lens and an eye piece, said housing having trunnions thereon and means to support said trunnions.

WILLARD C. ROBINETTE.